US012683693B2

(12) United States Patent
Paraiso et al.

(10) Patent No.: US 12,683,693 B2
(45) Date of Patent: Jul. 14, 2026

(54) OPTICAL TRANSMITTER, A QUANTUM COMMUNICATION SYSTEM AND A METHOD OF OPERATING AN OPTICAL TRANSMITTER

(71) Applicant: Kabushiki Kaisha Toshiba, Tokyo (JP)

(72) Inventors: Taofiq Paraiso, Cambridge (GB);
Andrew Simpkins, Cambridge (GB);
Mirko Sanzaro, Cambridge (GB);
Thomas Roger, Cambridge (GB);
Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 113 days.

(21) Appl. No.: 18/428,768

(22) Filed: Jan. 31, 2024

(65) Prior Publication Data

US 2025/0293784 A1 Sep. 18, 2025

(30) Foreign Application Priority Data

Apr. 6, 2023 (GB) ...................................... 2305185

(51) Int. Cl.
H04B 10/70 (2013.01)
H04B 10/50 (2013.01)
(Continued)

(52) U.S. Cl.
CPC ........... H04B 10/70 (2013.01); H04B 10/503 (2013.01); H04B 10/54 (2013.01); H04L 9/0852 (2013.01)

(58) Field of Classification Search
CPC ...... H04B 10/70; H04B 10/503; H04B 10/54; H04L 9/0852
See application file for complete search history.

(56) References Cited

U.S. PATENT DOCUMENTS

| | | | |
|---|---|---|---|
| 11,240,017 B2 | 2/2022 | Zbinden et al. | |
| 2015/0304051 A1* | 10/2015 | Yuan | H04B 10/70 |
| | | | 398/188 |

(Continued)

FOREIGN PATENT DOCUMENTS

| | | |
|---|---|---|
| GB | 2525399 A | 10/2015 |
| GB | 2553358 A | 3/2018 |

(Continued)

OTHER PUBLICATIONS

Combined Search and Examination Report issued Oct. 11, 2023 in GB application 2305185.7 filed on Apr. 6, 2023, citing documents 17 & 21-26 therein, 9 pages.

(Continued)

*Primary Examiner* — Baotran N To
(74) *Attorney, Agent, or Firm* — Oblon, McClelland, Maier & Neustadt, L.L.P.

(57) ABSTRACT

An optical transmitter for quantum key distribution. The transmitter comprises a first and a second. Each laser is configured to emit phase-randomised pulses. The transmitter further comprises an optical combiner configured to combine the pulses emitted from the first and second laser into a combined stream of pulses based on an adjustable combining ratio. The transmitter further comprises a Mach-Zehnder interferometer with a short and a long arm. The interferometer has an input port configured to receive the combined stream of pulses and an output port configured to provide an output of the interferometer. At least one of the arms comprises a phase controlling element to control a phase between the short and long arm.

19 Claims, 2 Drawing Sheets

(51) Int. Cl.
H04B 10/54 (2013.01)
H04L 9/08 (2006.01)

(56) References Cited

U.S. PATENT DOCUMENTS

| | | | |
|---|---|---|---|
| 2017/0237505 A1 | 8/2017 | Lucamarini et al. | |
| 2019/0260478 A1 | 8/2019 | Lucamarini et al. | |
| 2020/0067704 A1* | 2/2020 | Zbinden | H04B 10/07953 |
| 2024/0048242 A1* | 2/2024 | Griffiths | H04B 10/503 |

FOREIGN PATENT DOCUMENTS

| | | |
|---|---|---|
| GB | 2582311 A | 9/2020 |
| GB | 2536248 B | 10/2021 |
| JP | 2016-1868 A | 1/2016 |
| JP | 2017-146592 A | 8/2017 |
| JP | 2019-148794 A | 9/2019 |
| WO | WO 2020/200451 A1 | 10/2020 |

OTHER PUBLICATIONS

Semenenko, "Advances in Chip-Based Quantum Key Distribution" (thesis), 2020, 219 pages.

Sun et al., "Experimental Demonstration of Passive-Decoy-State Quantum-Key-Distribution with Two Independent Lasers", arXiv.org, 2016, 5 pages.

Zhang et al., "A Simple Scheme for Realizing the Passive Decoy-State Quantum Key Distribution", Journal of Lightwave Technology, vol. 36, No. 14, 2018, 6 pages.

Yin et al., "Experimental Decoy Quantum Key Distribution Up To 130KM Fiber", arXiv.org, 2007, 4 pages.

ETSI draft specification; QKD 003, vol. Isg Qkd Quantum Key Distribution, No. V0.0.5, 2017, "Quantum Key Distribution (QKD); Components and Internal Interfaces", 3 pages.

Lu et al., "FPGA based digital phase-coding quantum key distribution system", Science China Physics, Mechanics & Astronomy, vol. 58, No. 12, 2015, 7 pages.

Aldama et al., "Integrated QKD and QRNG Photonic Technologies," Journal of Lightwave Technology, vol. 40, No. 23, 2022, 20 pages.

Extended European Search Report Issued May 24, 2024 in European Application 23219859.8, citing documents 24-27 therein, 11 pages.

Sun, Shi-Hai et al., "Experimental Demonstration of Passive-Decoy-State Quantum-Key-Distribution with Two Independent Lasers", arXiv:1609.02653v1, 2016, 5 pages, XP080725373.

Zhang, Chun-Hui et al., "A Simple Scheme for Realizing the Passive Decoy-State Quantum Key Distribution", Journal of Lightwave Technology, vol. 36, No., 14, 2018, pp. 2868-2873, XP011684380.

Yin, Zhen-Qiang et al., "Experimental Decoy Quantum Key Distribution up to 130KM Fiber", arXiv:0704.2941v2, 2007, 4 pages, XP080282395.

Paraiso, Taofiq K. et al., "A photonic integrated quantum secure communication system", Nature Photonics, vol. 15, 2021, pp. 850-856, XP037601127.

Japanese Office Action issued Mar. 25, 2025, in corresponding Japanese Patent Application No. 2024-024862 (with English Translation), citing documents 15-17 and 24 therein, 12 pages.

Shi-Hai Sun, et al., "Experimental Demonstration of Passive-decoy-state Quantum Key Distribution with two Independent Lasers", Physical Review, arxiv.org, Cornell University Library,201 Olin Library Cornell University Ithaca, NY 14853, United States, Quantum American Physical Society, 2016, 5 pages.

* cited by examiner

|                | signal laser | decoy laser |
| -------------- | ------------ | ----------- |
| signal state   | on           | off         |
| decoy state    | off          | on          |
| vacuum state   | off          | off         |
Figure 2
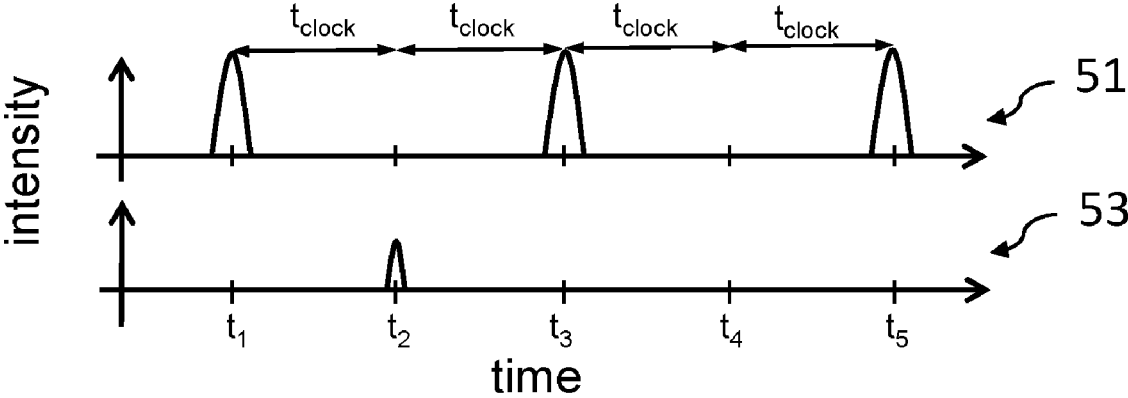
Figure 3
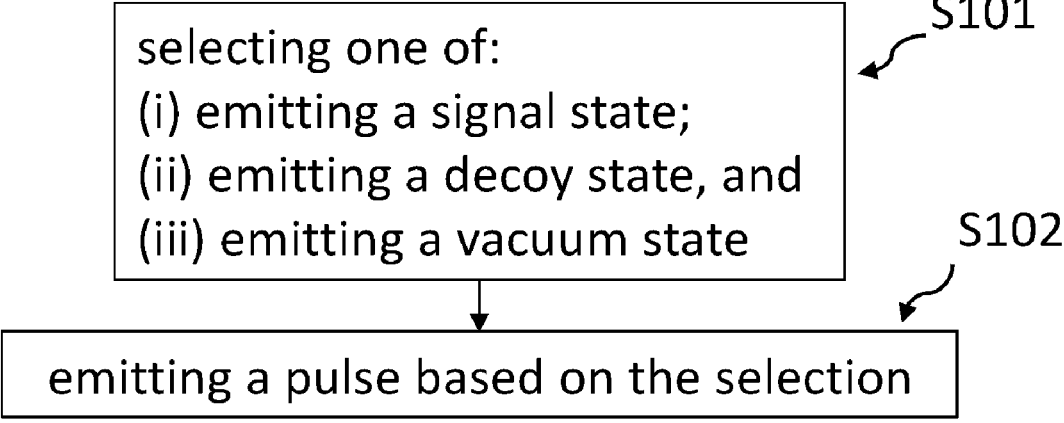
Figure 4

OPTICAL TRANSMITTER, A QUANTUM COMMUNICATION SYSTEM AND A METHOD OF OPERATING AN OPTICAL TRANSMITTER

CROSS REFERENCE

This application claims priority from UK application number 2305185.7, the contents of which are herein incorporated by reference.

TECHNICAL FIELD

Embodiments described herein relate to an optical transmitter, a quantum communication system and a method of operating an optical transmitter.

BACKGROUND

In a quantum communication system, information is sent between a transmitter and a receiver by encoded single quanta, such as single photons. Each photon carries one bit of information encoded upon a property of the photon, such as its polarization, phase or energy/time. A quantum communication system may be used to implement quantum key distribution (QKD) which is a technique for sharing of cryptographic keys between two parties; a transmitter, often referred to as "Alice", and a receiver, often referred to as "Bob". The attraction of this technique is that it provides a test of whether any part of the key can be known to an unauthorised eavesdropper, often referred to as "Eve".

QKD techniques (often called protocols) are frequently implemented with attenuated laser pulses instead of single photon states (e.g. by encoding cryptographic keys in the phase of attenuated laser pulses). This is because suitable single photon sources are not widely available. It is known that the use of attenuated laser pulses can make QKD protocols susceptible to photon number splitting attacks and thereby reduce the security of the communication. Specific QKD protocols have been developed to address this issue. In some of these protocols, the transmitter prepares and transmits a set of additional states (referred to as decoy states), in addition to the standard signal states. Decoy state pulses have an intensity (i.e. mean photon number) that different are from the intensity of the signal state pulses. Decoy-state QKD protocols can enhance the technology by ensuring keys can be shared at high bit rates over long distances with information theoretic security.

Decoy-state QKD protocols are frequently implemented using a single laser in combination with an intensity modulator to adjust the pulse intensity to correspond either to a signal state or to a decoy state. In practice, imperfections of commonly employed intensity modulators can create security threats (known as side channels). One such side channel (known as "patterning effect") is caused by the finite modulation bandwidth of the intensity modulators which can mean that the intensity of a transmitted pulse depends on the intensity of the previous pulse. This leaks information and can reduce the secure key rate.

BRIEF DESCRIPTION OF THE DRAWINGS

FIG. 2 shows a table specifying an example configuration of the optical system of FIG. 1.

FIG. 3 illustrates an example pulse sequence during use of the optical system of FIG. 1.
FIG. 4 is a flow diagram of an example process of operating the optical system of FIG. 1.

DETAILED DESCRIPTION

Figure 1:
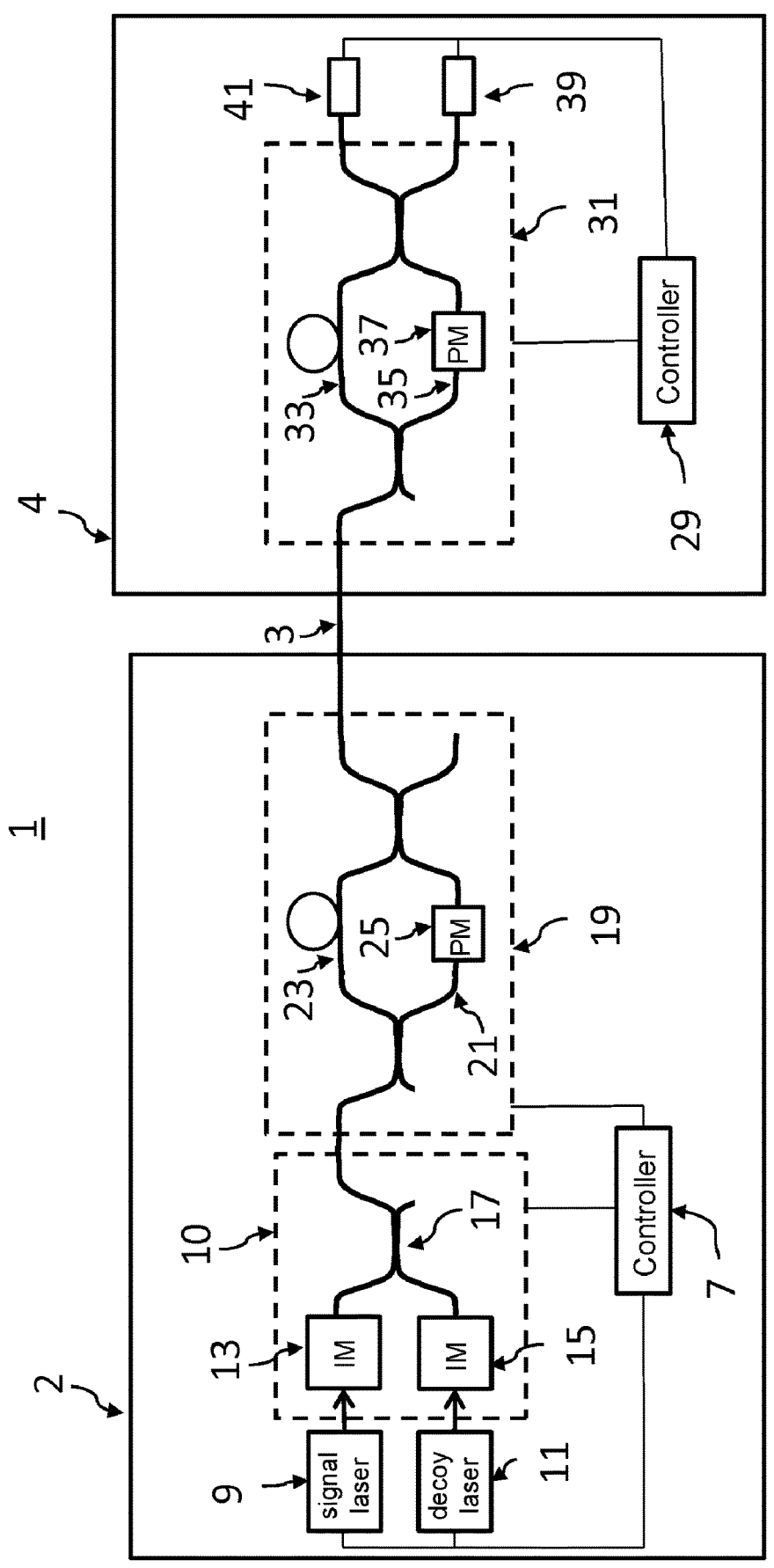
FIG. 1 is a schematic of an example optical system in accordance with an embodiment.

The present disclosure aims to provide new and useful optical devices for implementing (decoy-state) QKD protocols which overcome problems of conventional devices, for example the "patterning effect" associated with the finite bandwidth of intensity modulators. To this end, the present disclosure proposes an optical transmitter comprising two independent lasers to generate signal state and decoy state pulses respectively (decoy state pulses have an intensity, i.e. mean photon number, that is different from the intensity of the signal state pulses). The outputs of the two lasers are combined using an adjustable optical combiner, i.e. a combiner which combining ratio can be adjusted. Depending on the combining ratio, the combiner may modulate, e.g. by attenuation or amplification, the signal state pulses differently than the decoy state pulses. This allows to control an intensity ratio between signal state pulses and decoy state pulses. The pulses exiting the combiner are then transformed into time-bin qubits by an asymmetric Mach-Zehnder interferometer and transmitted to a receiver. A phase controlling element in one arm of the Mach-Zehnder interferometer can be used for phase-encoding of the time-bin qubits. In addition to the aforementioned signal and decoy states, the proposed transmitter can also emit vacuum states (as a second type of decoy state). The proposed transmitter can implement vacuum states by controlling the mean photon number of the emitted pulses to be zero (i.e. by simply switching both lasers off).

Using two independent lasers for generating the signal and decoy states means that no (fast) switching of intensity modulators or the like is needed since the splitting ratio of the optical combiner does not need to be switched during operation of the transmitter (suitable levels of attenuation or amplification can be determined during an initial or periodically repeated calibration process). Thus, the proposed transmitter does not suffer from to the "patterning effect" problem of conventional devices. The proposed way of generating signal and decoy states is compatible with photonic integration, enabling fully integrated QKD transmitters. Further a signal to noise ratio for vacuum states may be improved by the proposed transmitter compared to conventional implementations which prepare vacuum states by attenuating laser pulses with an intensity modulator (because of the finite extinction ration of commonly employed intensity modulators).

According to a first aspect, there is provided an optical transmitter for quantum key distribution. The transmitter comprises a first and a second laser. Each laser is configured to emit a respective plurality of optical pulses such that a phase of each pulse of the respective plurality of optical pulses is randomised. The transmitter further comprises an adjustable optical combiner configured to combine, based on an adjustable combining ratio, the pulses emitted by the first and second laser into a combined stream of pulses. The transmitter further comprises a Mach-Zehnder interferometer with a short arm and a long arm. The interferometer has an input port configured to receive the combined stream of pulses and an output port configured to provide an output of the interferometer. The transmitter further comprises an output coupler configured to provide the output of the interferometer to a quantum channel. At least one of the short and long arm comprises a phase controlling element configured to control a relative phase between the short and the long arm.

In an embodiment, the first laser is a gain-switched laser and/or the second laser is a gain-switched laser.

In an embodiment, the first and the second lasers, the optical combiner and the Mach-Zehnder interferometer may be formed on an integrated chip.

In an embodiment, the optical combiner comprises an intensity control element may be configured to adjustably modulate an intensity of the pulses emitted by the first laser. The combining ratio of the combiner may be adjustable by adjusting the modulation of the intensity control element.

In an embodiment, the intensity control element may be a first intensity control element, and the combiner may further comprise a second intensity control element configured to adjustably modulate an intensity of the pulses emitted by the second laser. The combining ratio of the combiner may be adjustable by adjusting the modulation of the first and second intensity control elements.

In an embodiment, the first and/or the second intensity control elements may comprise at least one of an electro-absorption modulator, a Mach-Zehnder modulator, a tuneable interferometer and a semiconductor optical amplifier.

In an embodiment, the combiner may comprise a Mach-Zehnder interferometer having two arms of substantially equal length and an adjustable phase controlling element in at least one arm. The combining ratio of the combiner may be adjustable by adjusting the phase controlling element.

In an embodiment, the combining ratio of the combiner may be adjusted such that, at the output coupler, the intensity of the pulses emitted by the first gain-switched laser is equal to a first predetermined intensity, and the intensity of the pulses emitted by the second gain-switched laser is equal to a second predetermined intensity. The second predetermined intensity may be lower than the first predetermined intensity.

In an embodiment, the quantum cryptography technique may be a decoy state quantum cryptography technique. The transmitter may be configured to encode signal states in pulses emitted by the first light source encodes, and decoy states in pulses emitted by the second light source.

In an embodiment, the transmitter may further comprise a further phase controlling element configured receive the output of the interferometer, control a phase of the output of the interferometer, and provide the phase-controlled output of the interferometer to the output coupler.

In an embodiment, the transmitter may be configured such that during each cycle of a clock rate at most one of the first and second gain-switched laser emits a pulse. Further in this embodiment, the transmitter may be configured to perform, for each cycle of the clock rate and based on a random number, one of:

emitting a pulse from the first gain-switched laser;

emitting a pulse from the second gain-switched laser, and emitting a vacuum pulse from each of the first and second gain-switched lasers of the transmitter. The optical transmitter may further comprise a random number generator configured to generate the random number.

In an embodiment, a time delay between the short arm and the long arm may be 500 ps or less, 250 ps or less, or 100 ps or less.

In an embodiment, the clock rate may be 1 GHz or greater.

According to a second aspect, there is provided a quantum communication system comprising the optical transmitter of the first aspect, an optical receiver and an optical channel configured to receive optical pulses from the output coupler of the optical transmitter and to propagate the optical pulses to the receiver. In an embodiment, the optical coupler will directly output pulses to the optical channel. In further embodiments, one of more components may be provided between the optical coupler and the output channel, for example, encoding components, attenuators etc. In an embodiment, the transmitter will be configured such that the pulses output to the optical channel are attenuated to a level such that the mean photon number in each pulse is less than 1 photon, this attenuation can be provided by the optical coupler or a further attenuator provided after the optical coupler. In an embodiment, the optical transmitter further comprises a further attenuator provided to further attenuate the output of the optical coupler such that the pulses output to the optical channel are attenuated to a level such that the mean photon number in each pulse is less than 1 photon. The further attenuator may be a fixed attenuator.

In an embodiment, the optical receiver may comprise a receiver Mach-Zehnder interferometer with a short arm and a long arm. The receiver interferometer may have an input port configured to receive the optical pulses from the quantum channel and an output port configured to provide an output of the receiver interferometer. The optical receiver may further comprise a single photon detector connected to the output port of the receiver interferometer. A time delay between the short arm and the long arm of the receiver interferometer may be equal to a time delay between the short arm and the long arm of the interferometer of the transmitter.

In an embodiment, at least one of the short and long arm of the receiver interferometer May comprise a receiver phase controlling element configured to control a relative phase between the short and the long arm of the receiver interferometer.

According to a third aspect, there is provided a method of operating the optical transmitter of the first aspect. The method comprises selecting one of (i) emitting a pulse from a first gain-switched laser of the transmitter, and (ii) emitting a pulse from a second gain-switched laser of the transmitter. The method further comprises emitting a pulse based on the selection.

According to a fourth aspect, there is provided a method of operating the optical transmitter of the first aspect. The method comprises selecting one of (i) emitting a pulse from a first gain-switched laser of the transmitter, (ii) emitting a pulse from a second gain-switched laser of the transmitter, and (iii) emitting a vacuum state pulse from each of the first and second gain-switched lasers of the transmitter. The method further comprises emitting a pulse based on the selection.

In broad terms, optical system 1, illustrated in FIG. 1, may be used to transmit optical pulses from one node of an optical network to another node via an optical channel. More particularly, the optical system 1 may be a quantum communication system for distributing a quantum cryptography key between a transmitter node and a receiver node. For example, phase-encoded time-bin qubits may be prepared at a transmitter node and may be transmitted to the receiver node via the optical (quantum) channel. In general, the optical system 1 may be operated to implement a quantum cryptography technique, for example a decoy-state quantum cryptography technique such as decoy-state BB84 protocols. In broad terms, decoy-state BB84 protocols are designed to overcome security issues of convention BB84 protocols which when implemented with weak coherent pulses may be prone to photon number splitting attacks. This is because an excess photon could be extracted and stored by an eavesdropper, allowing the eavesdropper to access information in key without being detected. Decoy-state BB84 protocols may rely on phase randomisation and weak coherent pulse intensities selected at random from a predetermined set of intensities. Randomly selecting the pulse intensities effectively mimic the preparation of a mixture of photon number states with variable Poissonian coefficients. This approach may provide a way estimate the expected yield of single photon pulses and detect a potential photon number splitting stack by an eavesdropper.

Referring to FIG. 1, the optical system 1 includes an optical transmitter 2, and an optical receiver 4. The transmitter 2 and the receiver 4 are connected with each other through a quantum channel 3. The quantum channel 3 may be an optical fibre through which optical pulses (encoding quantum bits) are transmitted.

In an embodiment, the transmitter 2 and the receiver 4 may be further connected with each other through a classical channel (not shown in FIG. 1). The classical channel may be a control channel through which control information for generating quantum key data is transmitted and received. In embodiments, the quantum channel 3 and the classical channel may be implemented over the same optical fibre. In this case, the respective signals may be multiplexed (i.e. combined) to be transmitted via the same optical fibre. For example, wavelength multiplexing may be employed when the signals transmitted via the classical channel have a different wavelength than the signal transmitted via the quantum channel 3. Optical signals transmitted via the classical channel typically have higher intensities than the signals transmitted via the quantum channel 3.

The transmitter 2 of FIG. 1 comprises a first and a second gain-switched semiconductor laser 9, 11 (hereafter signal laser 9 and decoy laser 11). The transmitter 2 further comprises an adjustable optical combiner 10, an asymmetric Mach-Zehnder interferometer 19 (hereafter encoding interferometer 19) and a controller 7.

The signal laser 9 and the decoy laser 11 may be configured to generate coherent light. For example, the signal laser 9 and the decoy laser 11 may be controlled (e.g. by the controller 7) to emit a continuous wave or to emit optical pulses of a predetermined duration. In an embodiment, the signal laser 9 and the decoy laser 11 may be configured such that each laser emits a respective plurality of optical pulses such that a phase of each pulse of the respective plurality of optical pulses is randomised. In other words, the signal laser 9 and the decoy laser 11 may be configured such that a phase difference between consecutive coherent pulses emitted by the same laser is random. In an embodiment, the predetermined duration of the pulses emitted by the signal laser 9 and the decoy laser 11 may be the substantially the same. For example, the duration of the pulses emitted by the lasers may be less than or equal to 40 ps.

The pulses from each laser are independent from each other and therefore the pulses from each laser have random phases relative to each other. The phase difference between two consecutive pulses emitted by the same laser is only truly random if there is no phase coherence between these consecutive pulses. For a semiconductor gain-switched laser, such as the signal laser 9 or the decoy laser 11, the laser emission is started by spontaneous emission. This is a random process, which means that the phase of the generated long light pulse will be random. In order that the random process of spontaneous emission is responsible for starting the laser emission for all pulses, the laser cavity needs to be completely empty before each pulse is generated, i.e. the applied current needs to be below the threshold current for a sufficiently long time in between pulses.

In an embodiment, the signal laser 9 and the decoy laser 11 may be gain-switched semiconductor laser diodes. More particularly, the signal laser 9 and the decoy laser 11 may be distributed feedback (DFB) lasers, vertical cavity surface emitting lasers or ridge lasers. Ridge lasers are also referred to as stripe lasers. A Fabry-Perot laser is a type of ridge or stripe laser. The terms stripe and ridge refer to the form of the laser waveguide. Fabry Perot refers to the form of the laser cavity i.e. two parallel mirrors made up by the end faces of the waveguide. In an embodiment, the signal laser 9 and the decoy laser 11 may emit light at a telecom wavelength.

In an embodiment, the signal laser 9 and the decoy laser 11 may be controlled (e.g. by controller 7) to output light at (substantially) the same wavelength. In this case, the optical spectrum of the light emitted by the signal laser 9 and the optical spectrum of the light emitted by the decoy laser 11 substantially overlap. For example, the centre wavelengths of the signal laser 9 and the decoy laser 11 may differ less than the respective FWHM linewidths (full width at half-maximum). To this end, controller 7 may be configured to control the temperatures (and/or the driving currents) of the lasers to adjust the wavelengths of the emitted light accordingly (e.g. through heating or cooling elements). In an embodiment, the transmitter 2 may further comprise means to detect a wavelength difference between lasers (for example a suitable arrangement for interfering the signals emitted by the lasers and detecting corresponding interference signals). In an embodiment, operating the signal laser 9 and the decoy laser 11 at (substantially) the same wavelength increases the security of the communication since a potential eavesdropper cannot identify which laser emitted a particular pulse by measuring the wavelength of the pulse.

The adjustable combiner 10 comprises a first and a second input port and an output port. The signal laser 9 is configured to supply coherent light to the first input port of the adjustable combiner 10. The decoy laser 11 is configured to supply coherent light to the first input port of the adjustable combiner 10.

In general, the adjustable combiner 10 is configured to combine optical signals received at the input ports based on a combining ratio. This means that the adjustable combiner 10 modulates (e.g. amplifies or attenuates) the optical signals received at the first and second input port according to the combining ratio. For example, the combining ratio may specify a relative amount of intensity modulation (e.g. attenuation or amplification) applied to the signals received at the first input port compared to the modulation applied to the signals received at the second input port. For example, the combining ratio may specify that optical signals received at the second input port are attenuated twice as much as optical signals received at the first input port. In other words, the adjustable combiner 10 allows to combine the optical signals received at the input ports and to control their relative intensity.

The adjustable combiner may be implemented in a number of ways. In an embodiment, the adjustable combiner may comprise an intensity modulator (or intensity control element) applied to the signals received at the first input port and an optical combiner which combines these modulated signals provided by the intensity modulator and the signals received at the second input port according to a fixed (i.e. not adjustable) combining ratio. The intensity modulator may modulate (e.g. attenuate or amplify) the signals received at the first port. Thus, in this case, the relative intensity of the signals received at the first and second port is controlled by appropriately adjusting the modulation applied by the intensity modulator. In addition, the adjustable combiner may also comprise a second intensity modulator applied to the signals received at the second input port. In this case, a modulation by the second intensity modulator may be adjustable independently from modulation of the intensity modulator of the first input port. Thus, the relative intensity of the signals received at the first and second port is controlled by appropriately adjusting the (independent) modulations applied by the intensity modulators. In the above, the intensity modulators may be implemented in any suitable manner, for example each of the intensity modulators may comprise at least one of an electro-absorption modulator, a Mach-Zehnder modulator, a tuneable interferometer and a semiconductor optical amplifier.

In another embodiment, the adjustable combiner may be implemented using a symmetric Mach-Zehnder interferometer. In particular, the combiner may comprise a Mach-Zehnder interferometer having two arms of substantially equal length and an adjustable phase controlling element in at least one arm. In this case, the two input ports of the combiner are connected respectively to the two input ports of the symmetric Mach-Zehnder interferometer and the output port of the combiner is connected to an output port of the symmetric Mach-Zehnder interferometer. The combining ratio of the adjustable combiner is then adjustable by adjusting the phase controlling element which controls an optical path length difference between the arms.

The adjustable combiner 10 of the transmitter 2 comprises a first and a second intensity modulator (IM) 13, 15 (hereafter signal IM 13 and decoy IM 15) and a non-adjustable optical combiner 17. Whilst transmitter 2 is described in the following with respect to the implementation of the adjustable combiner as shown in FIG. 1, it is understood that, in embodiments of the transmitter 2, the adjustable combiner 10 can be implemented in any of the ways described above.

Referring back to FIG. 1, amplitude of light propagating through the signal IM 13 (or the decoy IM 15) is modulated (e.g. attenuated or amplified) depending on an adjustable modulation of the signal IM 13 (or the decoy IM 15 respectively). In other words, the optical modulation (e.g. attenuation or amplification) of the signal IM 13 and the decoy IM 15 can be individually controlled (e.g. by controller 7). In some embodiments, the optical attenuation of the IMs 13, 15 may adjustable to any one of a set of discrete modulation values. In other embodiments, the optical modulation of the IMs 13, 15 may be (quasi-)continuously adjustable between a minimum and a maximum modulation value. As described above, a number of known optical components are suitable for modulation the coherent light provided by the signal laser 9 (or the decoy laser 11) and may be used to implement the IM 13, 15. In an embodiment, each of the signal IM 13 and the decoy IM 15 may be one of an electro-absorption modulator, a Mach-Zehnder modulator, a tuneable interferometer or a semiconductor optical.

The transmitter 2 further comprises an asymmetric Mach-Zehnder interferometer 19 (hereafter encoding interferometer 19). The non-adjustable optical combiner 17 is configured to combine the coherent light transmitted through the signal IM 13 and the coherent light transmitted through the decoy IM 15 into a combined optical path (e.g. a waveguide). The combiner is configured to combine the coherent light transmitted through the signal IM 13 and the coherent light transmitted through the decoy IM 15 based on a (fixed) combining ratio. In an embodiment, the combining ratio may be selected to be balanced, i.e. such that a relative intensity between coherent light transmitted through the signal IM 13 and the coherent light transmitted through the decoy IM 15 is substantially maintained in the combined optical path. In alternative embodiment, the combining ratio may be selected to be imbalanced.

The encoding interferometer 19 is configured to receive, at an input port of a beam splitter, coherent light from the combined optical path of the combiner 17 and to split the received light into a long arm 23 and a short arm 21. The long arm 23 and the short arm 21 are combined again via a beam splitter. As shown in FIG. 1, one output of the beam splitter provides the output of the encoding interferometer 19. The optical path length of long arm 23 is longer than the optical path length of the short arm 21. An optical pulse propagating in the long arm 23 of the encoding interferometer 19 is delayed by a delay time to with respect to pulses travelling in the short arm 21. In embodiments, the delay time to is less than or equal to 500 ps, or less than or equal to 250 ps.

One arm of the encoding interferometer 19 comprises phase controlling element 25. The phase controlling element 25 is configured to control a relative phase between the long arm 23 and the short arm 21. For example, the phase controlling element 25 may be a phase modulator that is configured to provide an adjustable phase shift to optical pulses propagating through the phase modulator. In the embodiment shown in FIG. 1, the encoding interferometer 19 comprises the phase controlling element 25 in the short arm 21. In an alternative embodiment, the encoding interferometer 19 comprises the phase controlling element 25 in the long arm 23. In another embodiment, both the long arm 23 and the short arm 21 comprise respective phase controlling elements which are configured to cooperatively control the relative phase between the long arm 23 and the short arm 21. In an embodiment, phase controlling element 25 may be a thermal phase shifter or an electro-optic phase modulator.

The encoding interferometer 19 is suitable to prepare, from the optical pulses emitted by the lasers 9, 11, a plurality of quantum states suitable to implement quantum cryptography techniques, for example the above described decoy-state BB84 protocol. In particular, the encoding interferometer 19 may be used for time-bin encoding of quantum information, i.e. the encoding interferometer 19 transforms an optical pulse emitted from one of the lasers 9, 11 into a time-bin qubit, i.e. into two pulses with a well-defined temporal separation (given by the delay time to of the interferometer) and with a well-controlled phase relationship (controlled by the phase controlling element 25). For example, a pulse emitted by the signal laser 9 may be transformed by the encoding interferometer 19 is one of four signal states of the BB84 protocol, where the four states correspond to a choice between two bases (e.g. either Z or X) and to a choice between a bit value (either 0 or 1). A choice of basis may correspond to selecting a phase value $\alpha_A=0$ or $\alpha_A=\pi/2$. A choice of bit value may correspond to selecting a phase value $\beta_A=0$ or $\beta_A=\pi$, respectively. The desired signal state can then be prepared by controlling the phase controlling element 25 to adjust the phase difference between the long arm 23 and the short arm 21 to be $\alpha_A+\beta_A$.

In the embodiment of FIG. 1, the output of the encoding interferometer 19 is provided to the quantum channel 3, for example via an output coupler. In an embodiment, in addition to or instead of the controlling element 25, the transmitter 2 may also comprise a further phase controlling element (not shown in FIG. 1) configured to apply a phase shift to the output of the encoding interferometer 19 and to provide the phase-shifted output of the encoding interferometer 19 to the quantum channel 3.

The controller 7 of the transmitter 2 is configured to control the operation of the lasers 9, 11, the IMs 13, 15, and the phase controlling element 25. To this end, the controller 7 may apply (time varying) electrical signals to the lasers 9, 11, the IMs 13, 15, and the phase controlling element 25, for example as described below with reference to FIGS. 2-4. The controller 7 may comprise electrical circuitry to generate and apply appropriate electrical signals for controlling the lasers 9, 11, the IMs 13, 15, and the phase controlling element 25.

In an embodiment, the controller 7 further comprises a random number generator configured to generate random numbers. In another embodiment, the controller 7 is configured to receive random numbers from an external device and to store the received random numbers for use during operation of the transmitter 2. As described below with reference to FIGS. 2-4, the transmitter may typically be operated with a particular clock rate, and during each cycle of the clock rate may randomly select a state (from a set of states) that the transmitter 2 prepares and emits next. The state selection may be based on the random numbers (whether generated or received by the controller 7).

In an embodiment, the transmitter 2 may comprise a photonic integrated circuit (PIC). The PIC may comprise a semiconductor substrate, and the lasers 9, 11, IMs 13, 15 and the interferometer 19 may be integrated on the semiconductor substrate. The integrated components may be appropriately connected with each other by integrated optical channels (such as a waveguides) that allow light propagation between the components. In some embodiments, the controller 7 may be fully or partially integrated in the PIC. The PIC may be formed of InP. The components integrated in the PIC and any ports for providing optical signals may be formed together. To this end, patterns may be defined by photolithography and/or e-beam lithography, and corresponding structures may be formed by plasma dry etching methods. For example, reactive-ion etching (RIE) methods, such as inductively coupled plasma (ICP) RIE and deep reactive ion etching (DRIE), may be used to form the structures. Optical waveguides to connect the components integrated in the PIC may be formed using (optical and/or electron) lithography, (plasma and/or chemical) etching, direct laser writing, ion exchange, nanoimprint, and the like. In other embodiments, the PIC may be formed of another suitable semiconductor material system, for example Si, SOI, SiN, SiO2, SiON, or GaAs. Alternatively, the PIC may be formed of glasses or polymers. Hybrid integration and heterogeneous integration techniques can be used to form the PIC using more than one of material system. In embodiments where the signal laser 9 and the decoy laser 11 are formed on the same semiconductor substrate and both lasers are of the same type (e.g. both lasers are either distributed feedback (DFB) lasers, vertical cavity surface emitting lasers or ridge lasers), both lasers may be (substantially) identical and may operate at (substantially) the same wavelength for the (substantially) the same operating conditions (e.g. temperature and driving current). Thus, in this cases a task of controlling the lasers to emit at (substantially) the same wavelength may be eased.

The receiver 4 is configured to receive, from the quantum channel 3, optical signals emitted by the transmitter 2. More particularly, the receiver 4 may be configured to receive optical pulses encoding time-bin qubits from the transmitter 4, and to decode the received qubits using an asymmetric Mach-Zehnder interferometer and two single (or more) photon detectors.

The receiver 4 comprises an asymmetric Mach-Zehnder interferometer 31 (hereafter decoding interferometer 31) for decoding the received time-bin qubits. The decoding interferometer 31 is configured to receive, at an input port of a beam splitter, coherent light from the quantum channel 3, and to split the received light into a long arm 33 and a short arm 35. The long arm 33 and the short arm 35 are combined again via a beam splitter. As shown in FIG. 1, the beam splitter provides two output ports of the decoding interferometer 31 which are respectively connected to single photon detectors 39, 41. The optical path length of long arm 33 is longer than the optical path length of the short arm 35. The decoding interferometer 31 is configured such that a delay time of the decoding interferometer 31 is substantially equal to the delay time of the interferometer 19. The single photon detectors 39, 41 are configured to receive and detect coherent light from the decoding interferometer 31. The single photon detectors 39, 41 may have a bandwidth exceeding the $1/t_0$ (i.e. the inverse of the delay time to of the encoding/decoding interferometers 19, 31). In an embodiment, the single photon detectors 39, 41 may have a bandwidth exceeding 20 GHz.

The decoding interferometer 31 comprises a decoding phase controlling element 37 in one of the arms. The decoding phase controlling element 37 is configured to control a relative phase between the long arm 33 and the short arm 35. For example, the decoding phase controlling element 37 may be a phase modulator that is configured to provide an adjustable phase shift to optical pulses propagating through the phase modulator. In the embodiment shown in FIG. 1, the decoding interferometer 31 comprises the phase controlling element 37 in the short arm 35. In an alternative embodiment, the decoding interferometer 31 comprises the phase controlling element 37 in the long arm 33. In another embodiment, both the long arm 33 and the short arm 35 comprise respective phase controlling elements which are configured to cooperatively control the relative phase between the long arm 33 and the short arm 35. In an embodiment, decoding phase controlling element 37 may be a thermal phase shifter or an electro-optic phase modulator. For example, the phase controlling element may be set to a phase value of either $\alpha_A=0$ or $\alpha_A=\pi/2$ to decode a received time-bin qubit in either the Z or X basis.

The controller 29 of the receiver 4 is configured to control the operation of the decoding phase controlling element 37 and the single photon detectors 39, 41. To this end, the controller 7 may apply (time varying) electrical signals to the decoding phase controlling element 37 and the single photon detectors 39, 41. The controller 29 may comprise electrical circuitry to generate and apply appropriate electrical signals for controlling the decoding phase controlling element 37 and the single photon detectors 39, 41.

In an embodiment, the receiver 4 may comprise a photonic integrated circuit (PIC). The PIC of the receiver 4 may comprise a semiconductor substrate, and the decoding interferometer 31 and the detectors 39, 41 may be integrated on the semiconductor substrate. In some embodiments, the controller 29 of the receiver 4 may be fully or partially integrated in the PIC. The PIC of the receiver 4 may be formed of InP. In other embodiments, the PIC of the receiver 4 may be formed of another suitable semiconductor material system, for example Si, SOI, SiN, SiO2, SiON, or GaAs. Alternatively, the PIC may be formed of glasses or polymers. Hybrid integration and heterogeneous integration techniques can be used to form the PIC of the receiver 4 using more than one of material system.

The optical system 1 may be used to implement decoy-state QKD protocols. In an embodiment, a decoy-state QKD protocol may require the transmitter to prepare (in each clock cycle) a pulse with one of three intensities. Signal state pulses may be prepared with a first pulse intensity, first decoy states may be prepared with a second pulse intensity, and second decoy states may be prepared with a third intensity. The transmitter 2 of the optical system 1 can implement such a decoy-state based QKD protocol while avoiding the "patterning effect" issues of conventional devices. To this end, signal states can be encoded by pulses emitted from the signal laser 9. The intensity of the signal state pulses can be adjusted with the IM 13. First decoy states (hereafter just decoy states) can be encoded by pulses emitted from the decoy laser 11. The intensity of the decoy state pulses can be adjusted with the IM 15 to be different (higher or lower) than the intensity of the signal state pulses. Second decoy states can be encoded by vacuum state pulses (i.e. by pulses with a mean photon number of zero). Thus, emitting a vacuum state during a particular clock cycle means that the mean photon number provided at the output coupler of the transmitter 2 is (substantially) zero. The desired intensities of the signal and decoy states (and therefore the corresponding modulations of the IMs 13, 15) may be selected to optimise a secure key rate of the optical system 1 (and may be found by performing an appropriate calibration process).

FIG. 2 shows a table with an example configuration of the transmitter 2 for implementing the aforementioned preparation of signal, decoy or vacuum pulses. To transmit a signal state from the transmitter 2 to the receiver 4 during a particular clock cycle, the signal laser 9 may be operated to emit a pulse while the decoy laser 11 is switched "off" (e.g. a drive current of the decoy laser 11 is switched off or at least below the laser threshold of the decoy laser 11). To transmit a decoy state from the transmitter 2 to the receiver 4 during a particular clock cycle, the decoy laser 11 may be operated to emit a pulse while the signal laser 9 is switched "off" (e.g. a drive current of the signal laser 9 is switched off or at least below the laser threshold of the signal laser 9). To transmit a vacuum state from the transmitter 2 to the receiver 4 during a particular clock cycle, both the signal laser 9 and the decoy laser 11 may be switched "off" (e.g. the respective drive currents are switched off or at least below the laser thresholds of the lasers).

In the above, vacuum state pulses are prepared by switching off both lasers. This advantageous over conventional device that prepare vacuum states by attenuation of laser pulses because this allows for a better signal to noise ratio, for example when estimating the dark count rate and the secure key rate.

Because the modulations of the IMs 13, 15 do not need to be switched once the desired intensity values for the signal and decoy states have been found, "patterning effect" problems of conventional devices are prevented. The transmitter 2 provides therefore an elegant solution to a problem of generating decoy states without creating information leaking side-channels.

An example operation of the optical system 1 is further described with reference to FIGS. 3-4. FIG. 3 shows in graphs 51 and 53 the intensity of the light emitted respectively by the signal laser 9 and the decoy laser 11 after modulation by the signal IM 13 and the decoy IM 15. In this example, the transmitter 2 is operated at a clock rate (e.g. 1 GHz or higher), and the graphs of FIG. 3 illustrate the operation of the transmitter 2 for five clock cycles (indicated as $t_1$ to $t_5$ in FIG. 3). At each of these clock cycles, the steps S101 and S102 of the example process of FIG. 4 are performed. The duration of a clock cycle period is denoted $t_{clock}$ in FIG. 3.

In step S101, one of emitting a signal state, a decoy state, and a vacuum state is selected. In an embodiment, this means one of (i) emitting a pulse from a first gain-switched laser of the transmitter, (ii) emitting a pulse from a second gain-switched laser of the transmitter, and (iii) emitting a vacuum state pulse from each of the first and second gain-switched lasers of the transmitter, is selected.

In an embodiment, the selection in step S101 may be based on a random number. The random number may be provided by the controller 7. During each clock cycle a different random number may be used for the selection in step S101.

In an embodiment, step S101 further comprises randomly selecting a basis and a bit value, and adjusting the encoding interferometer (i.e. adjusting the phase value applied by the phase controlling element 25) to encode the selected basis and bit value. The selection of the basis and bit value may be based on the same random number as used for the selection of signal/decoy/vacuum state or it may be a different random number provided by the controller 7.

For example, in FIG. 3, during the first clock cycle (time $t=t_1$), the emission of a signal state is selected and consequently a pulse is emitted from the signal laser 9 and modulated by the signal IM 13 according to a predefined modulation. Decoy laser 11 does not emit a pulse during this clock cycle. During the second clock cycle (time $t=t_2$), the emission of a decoy state is selected and consequently a pulse is emitted from the decoy laser 11 and modulated by the decoy IM 15 according to a predefined modulation. Signal laser 9 does not emit a pulse during this clock cycle. As shown in FIG. 4, in this example the intensity of the decoy state pulse after the IM 15 (at time $t_2$) is lower than the intensity of the signal state pulse after the IM 13 (e.g. at time $t_1$). Further in this example, another signal state pulse is created during the third clock cycle (time $t=t_3$). During the fourth cycle time (time $t=t_4$), the emission of a vacuum state is selected, and neither the signal laser 9 nor the decoy laser 11 are switched on.

In the examples of FIG. 2-4, the operation of the transmitter 2 has been described in the context of a decoy-state based QKD protocol where the transmitter 2 selects (at every clock cycle) between emitting signal states, decoy states or vacuum. It is understood that the transmitter 2 may also be used to implement other (decoy-state) QKD protocols. For example, in an embodiment the transmitter 2 may (at every clock cycle) select between emitting either signal states or decoy states (i.e. in this example the transmitter vacuum does not select emitting vacuum states).

As mentioned above, whilst the embodiment of FIG. 1 comprises a transmitter with two IMs (one for each laser), a variation of the transmitter 2 may have only one IM (before the combiner). In such an embodiment, the output of one laser (say the decoy laser) is passed through an intensity modulator (as shown in FIG. 1) while the output of the other laser (the signal laser) is directed directly into the combiner (i.e. without passing through an intensity modulator). In this example, the intensity of the signal state pulses, when provided to the quantum channel, is determined by the initial intensity of the pulses and the (static) optical losses on the transmitter. Further in this example, the intensity modulator may be used to adjust the intensity of the decoy pulses (such that the intensity of the decoy state pulses when provided to the quantum channel is sufficiently different from the intensity of the signal states).

In a further embodiment, the transmitter 2 may further (i.e. in addition to the adjustable combiner 10) comprise a first and second high-speed intensity modulator. In this embodiment, light emitted by the signal laser 9 is modulated by the first high-speed modulator and light emitted by the decoy laser 11 is modulated by the second high-speed modulator. The first and second high-speed modulators may be switchable between (at least) two states, an on-state and an off-state. The intensity of the modulated pulses is higher when the high-speed modulator is in the on-state than in the off-state (e.g. an attenuation is lower in the on-state than in the off-state, or an amplification is higher in the on-state than in the off-state). In particular, the pulses modulated by one of the high-speed modulators in the off-state have a negligibly low intensity. An effect of the provision of the high-speed modulators is that the signal and decoy lasers 9, 11 can be operated at a fixed pulse (e.g. the same) repetition rate, and, for every clock cycle, the respective high-modulators can be controlled to select whether a signal state pulse or a decoy state pulse should be transmitted to the adjustable combiner 10.

The above embodiments have primarily referred to the use of the optical transmitter for producing signal and decoy states, but the optical transmitter can be used for any type of multiplexing of two or more laser outputs. In a further embodiment, the first and second lasers have different wavelengths and the optical combiner is used to allow wavelength multiplexing, while independently adjusting the mean photon numbers.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An optical transmitter for quantum key distribution according to a quantum cryptography technique, the transmitter comprising:

a first laser and a second laser, each laser configured to emit a respective plurality of optical pulses such that a phase of each pulse of the respective plurality of optical pulses is randomized;

an adjustable optical combiner configured to combine, based on an adjustable combining ratio, the pulses emitted by the first laser and second laser into a combined stream of pulses;

an asymmetric interferometer with a short arm and a long arm, the interferometer having an input port configured to receive the combined stream of pulses and an output port configured to provide an output of the interferometer; and an output coupler configured to provide the output of the asymmetric interferometer to a quantum channel, wherein at least one of the short and long arm comprises a phase controlling element configured to control a relative phase between the short and the long arm, and the adjustable optical combiner comprises an interferometer having two arms of equal length and an adjustable phase controlling element in at least one arm, the combining ratio of the combiner being adjustable by adjusting the adjustable phase controlling element.

2. The optical transmitter of claim 1, wherein the first and the second lasers, the optical combiner and the asymmetric interferometer are formed on an integrated chip.

3. The optical transmitter of claim 1, wherein the adjustable optical combiner further comprises an intensity control element configured to adjustably modulate an intensity of the pulses emitted by the first laser, the combining ratio of the combiner being adjustable by adjusting the modulation of the intensity control element.

4. The optical transmitter of claim 3, wherein the intensity control element is a first intensity control element, and the adjustable optical combiner further comprises a second intensity control element configured to adjustably modulate an intensity of the pulses emitted by the second laser, the combining ratio of the combiner being adjustable by adjusting the modulation of the first and second intensity control elements.

5. The optical transmitter of claim 4, wherein the first intensity control element and/or the second intensity control element comprises at least one of an electro-absorption modulator, a Mach-Zehnder modulator, a tuneable interferometer, and a semiconductor optical amplifier.

6. The optical transmitter of claim 1, wherein the combining ratio of the adjustable optical combiner is adjusted such that, at the output coupler, an intensity of the pulses emitted by the first laser is equal to a first predetermined intensity, and an intensity of the pulses emitted by the second laser is equal to a second predetermined intensity, the second predetermined intensity being different from the first predetermined intensity.

7. The optical transmitter of claim 1, wherein the quantum cryptography technique is a decoy state quantum cryptography technique, and the optical transmitter is configured to encode either signal states or decoy states in pulses emitted by the first laser encodes, and the other one of signal states or decoy states in pulses emitted by the second laser.

8. The optical transmitter of claim 1, further comprising a further phase controlling element configured receive the output of the asymmetric interferometer, control a phase of the output of the asymmetric interferometer, and provide the phase-controlled output of the asymmetric interferometer to the output coupler.

9. The optical transmitter of claim 1, wherein the optical transmitter is configured such that during each cycle of a clock rate at most one of the first and second lasers emits a pulse.

10. The optical transmitter of claim 9, wherein the optical transmitter is configured to perform, for each cycle of the clock rate and based on a random number, one of:

emitting a pulse from the first laser;

emitting a pulse from the second laser, and emitting a vacuum pulse from each of the first and second lasers of the transmitter.

11. The optical transmitter of claim 10, further comprising a random number generator configured to generate the random number.

12. The optical transmitter of claim 1, wherein a time delay between the short arm and the long arm is 500 ps or less.

13. The optical transmitter of claim 9, wherein the clock rate is 1 GHz or greater.

14. The optical transmitter of claim 1, wherein the first and second lasers are gain-switched lasers.

15. A quantum communication system for quantum key distribution according to a quantum cryptography technique, the system comprising:

an optical transmitter;

15 an optical receiver; and an optical channel configured to receive optical pulses from an output coupler of the optical transmitter and to propagate the optical pulses to the optical receiver, wherein the optical transmitter comprises a first laser and a second laser, each laser configured to emit a respective plurality of optical pulses such that a phase of each pulse of the respective plurality of optical pulses is randomized;

an adjustable optical combiner configured to combine, based on an adjustable combining ratio, the pulses emitted by the first laser and second laser into a combined stream of pulses;

an asymmetric interferometer with a short arm and a long arm, the interferometer having an input port configured to receive the combined stream of pulses and an output port configured to provide an output of the interferometer; and the output coupler configured to provide the output of the asymmetric interferometer to a quantum channel, wherein at least one of the short and long arm comprises a phase controlling element configured to control a relative phase between the short and the long arm, and the adjustable optical combiner comprises an interferometer having two arms of equal length and an adjustable phase controlling element in at least one arm, the combining ratio of the combiner being adjustable by adjusting the adjustable phase controlling element.

16. The quantum communication system of claim 15, wherein the optical receiver further comprises:

an asymmetric receiver interferometer with a short arm and a long arm, the receiver interferometer having an input port configured to receive the optical pulses from the quantum channel and an output port configured to provide an output of the asymmetric receiver interferometer, and a single photon detector connected to the output port of the asymmetric receiver interferometer, wherein a time delay between the short arm and the long arm of the asymmetric receiver interferometer is equal to a time delay between the short arm and the long arm of the interferometer of the optical transmitter.

17. The quantum communication system of claim 16, wherein at least one of the short and long arm of the asymmetric receiver interferometer comprises a receiver phase controlling element configured to control a relative phase between the short and the long arm of the asymmetric receiver interferometer.

18. A method of operating an optical transmitter for quantum key distribution according to a quantum cryptography technique, the optical transmitter comprising a first laser and a second laser, each laser configured to emit a respective plurality of optical pulses such that a phase of each pulse of the respective plurality of optical pulses is randomized;

an adjustable optical combiner configured to combine, based on an adjustable combining ratio, the pulses emitted by the first laser and second laser into a combined stream of pulses;

an asymmetric interferometer with a short arm and a long arm, the interferometer having an input port configured to receive the combined stream of pulses and an output port configured to provide an output of the interferometer; and an output coupler configured to provide the output of the asymmetric interferometer to a quantum channel, wherein at least one of the short and long arm comprises a phase controlling element configured to control a relative phase between the short and the long arm, and the adjustable optical combiner comprises an interferometer having two arms of equal length and an adjustable phase controlling element in at least one arm, the combining ratio of the combiner being adjustable by adjusting the adjustable phase controlling element, the method comprising:

selecting one of:

(i) emitting a pulse from the first laser of the optical transmitter, and (ii) emitting a pulse from the second laser of the optical transmitter, and emitting a pulse based on the selection.

19. A method of operating an optical transmitter for quantum key distribution according to a quantum cryptography technique, the optical transmitter comprising a first laser and a second laser, each laser configured to emit a respective plurality of optical pulses such that a phase of each pulse of the respective plurality of optical pulses is randomized;

an adjustable optical combiner configured to combine, based on an adjustable combining ratio, the pulses emitted by the first laser and second laser into a combined stream of pulses;

an asymmetric interferometer with a short arm and a long arm, the interferometer having an input port configured to receive the combined stream of pulses and an output port configured to provide an output of the interferometer; and an output coupler configured to provide the output of the asymmetric interferometer to a quantum channel, wherein at least one of the short and long arm comprises a phase controlling element configured to control a relative phase between the short and the long arm, and the adjustable optical combiner comprises an interferometer having two arms of equal length and an adjustable phase controlling element in at least one arm, the combining ratio of the combiner being adjustable by adjusting the adjustable phase controlling element, the method comprising:

selecting one of:

(i) emitting a pulse from the first laser of the optical transmitter;

(ii) emitting a pulse from the second laser of the optical transmitter, and (iii) emitting a vacuum state pulse from each of the first and second lasers of the optical transmitter, and emitting a pulse based on the selection.

* * * * *